United States Patent
Wada

[11] 3,720,021
[45] March 13, 1973

[54] METHOD FOR REMOVING CUTTING AND GRINDING BURRS FROM MACHINED INJECTION NEEDLE TUBES

[76] Inventor: Shoji Wada, 4-11, Katase-Kaigan, 1-chome, Fujisawa-shi, Kanagawa-ken, Japan

[22] Filed: Dec. 22, 1970

[21] Appl. No.: 100,717

[52] U.S. Cl..................51/281 R, 29/421, 29/427, 51/320
[51] Int. Cl...............................B24c 1/00
[58] Field of Search ....51/281 R, 323, 285, 317–321, 51/227 H; 29/558, 421, 427, 81, 90, 89.5; 83/701, 177; 18/5 BS; 72/56

[56] References Cited

UNITED STATES PATENTS

| 2,138,520 | 11/1938 | Elliot | 51/285 X |
| 3,524,367 | 8/1970 | Franz | 83/177 X |
| 3,543,619 | 12/1970 | Hellmer | 83/177 X |
| 2,761,250 | 9/1956 | Molinari | 51/227 H |

Primary Examiner—Donald G. Kelly
Attorney—James E. Armstrong and Ronald S. Cornell

[57] ABSTRACT

A method is provided for removing the cutting and grinding burrs sticking to or generated at the cut or ground tips of injection needle tubes. A high pressure water stream is sprayed over injection needle tubes cut to a specified length or ground at one end. The needle tubes are held upright closely adjacent to one another within a water-draining basket stretched at the bottom with a metal wire-net or the like, and the basket is put on a metal wire net conveyor continuously moving at a slow rate.

3 Claims, 9 Drawing Figures

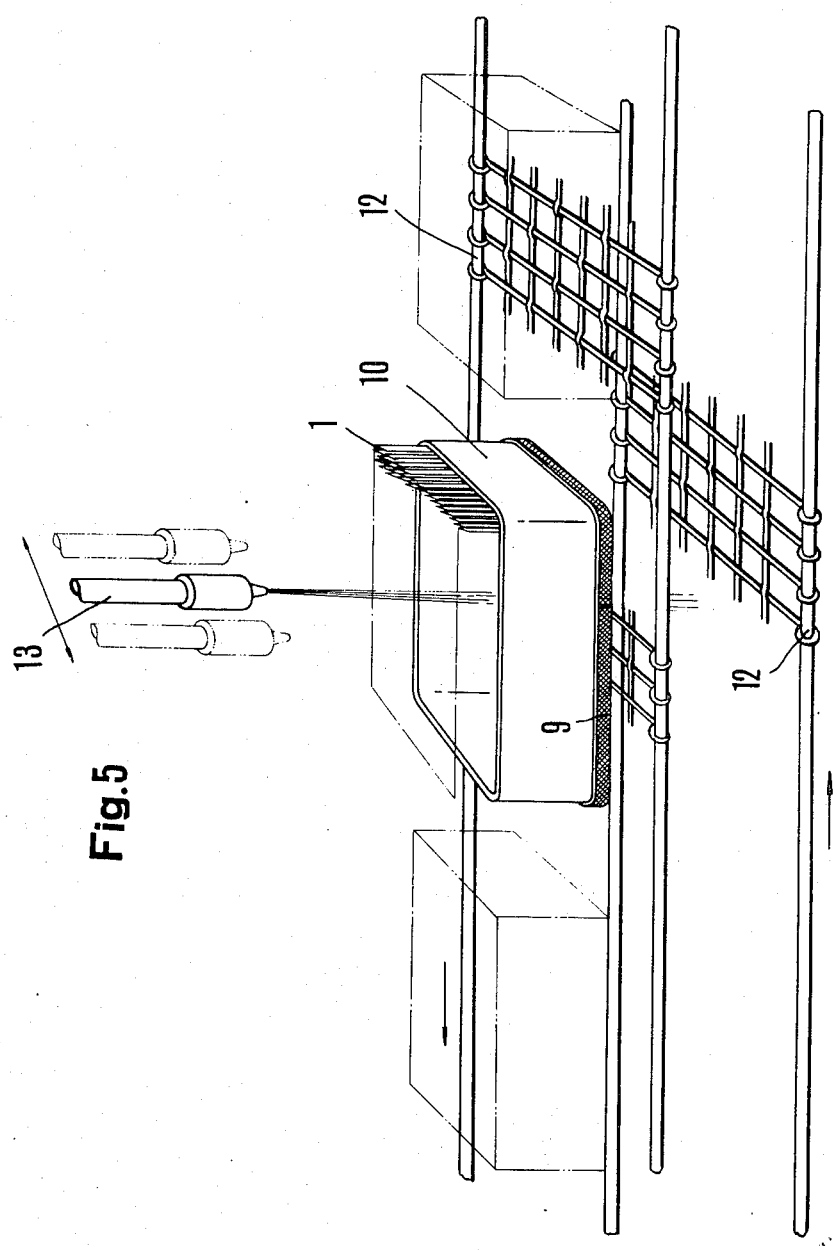

METHOD FOR REMOVING CUTTING AND GRINDING BURRS FROM MACHINED INJECTION NEEDLE TUBES

BACKGROUND OF THE INVENTION

In general an injection needle should be manufactured with high dimensional accuracy. From a standpoint of safety and hygiene in use, the needle surface must be well polished; the inside wall of the needle must have the least possible flow resistance, and must be beautiful and sanitary; and, moreover, the needle itself must meet specified high standards of toughness and rigidity. For these reasons, injection needles are machined from fine tubes of 18-8 stainless steel with a rich content of nickel.

To produce injection needles of fine stainless steel tubes by grinding one end of the tubes, the following method is used: A large number of stainless steel tubes cut to a specified length are arranged in rows with one end of each tube being clamped between two holding plates, upper and lower, of a jig. The other ends of the aligned tubes projecting over the jig are ground by a grinder to form a main bevel at a specified angle. Next, one of the holding plates of the jig is shifted right or left so as to turn the tubes to a different angle and then both sides of the main bevel are ground to form side bevels, thereby producing injection needle tubes with a piercing point at the tip.

In the above process of cutting the stainless steel tubes or grinding them to form the main and side bevels, burrs develop and stick, covering the cut or ground portions of the tubes even if wet grinding is performed under the best of grinding conditions. Such a result is inevitable from the nature of the material of the tubes.

The complexity of the burr-removing step, the excess time needed for this step, and the inadequacy of the removal technique have impeded the production of injection needles on a conveyor-line basis or on a mass production basis and at the same time have resulted in products of inferior quality.

Thus, the most important problem to be solved in the manufacture of injection needles is to work out a method and apparatus that can completely remove the cutting and grinding burrs without dulling the needle point, without deteriorating the toughness and rigidity of the needle, or without discoloring the needle point; and can make it possible to mass-produce cheap needles in demand quantities with reduced manpower and increased productivity.

Various methods now used for removing the needle burrs have drawbacks which result in poor quality of products and such methods are not fit for mass production.

In one of these methods, a skilled worker has to remove the burrs from each cut or ground needle tube, using a burr-removing jig. Although the quality of the needle is not deteriorated during burr removal, this method is time-consuming, with each tube being manually handled, and accordingly is so inefficient that it cannot produce enough needles to meet the demand. Besides, even a skilled worker could accidentally damage the point and, therefore, rejects are not precluded. Moreover, the job itself being skilled labor, it takes certain length of time to train a qualified worker and accordingly recruiting necessary workers is not easy.

In another method, which is called chemical polishing, an acid solution composed of several acids is boiled; the burred portion of the injection needle is immersed in this solution to remove the burrs through etching; then the needle is dipped into an alkaline solution to neutralize the acid, and finally the needle is washed with water.

When perfect removal of burrs is accomplished by this method, the needle point immersed in the acid solution is also etched while the burr is being etched and removed from the needle. Therefore, when neutralized with alkali and washed with water, the ground point of the needle will be blunted, with a considerable loss in its piercing effect; moreover, the wall thickness of the needle tube is reduced and with the resultant decrease in the toughness of the needle point, the safety of the injection needle is lost, because the needle may bend at the tip in use.

For the simple purpose of removing the burrs, this method involves too many steps: acid etching, alkaline neutralization, and water flushing. Furthermore each step, on account of its nature, must be performed at different sites with careful attention to the work environment.

Thus, this method too is unfit for conveyor-line production; it lacks efficiency and mass-productivity. As the sharpened point of needle tube becomes increasingly exposed to damage on account of reduction in wall thickness after each step, it is extremely difficult to handle the needle and in consequence, rejects frequently occur in production. It should be noted also that chemical polishing cannot assure dimensional accuracy and uniformity of gloss for a large number of needles.

A third method is what is called electrolytic polishing. According to this method, the burred portion of the needle is immersed in the electrolyte of an electrolytic bath; the immersed needle is positive and an insoluble metal added to the electrolyte is negative; and thus electric current develops between the two poles to dissolve and remove the burrs sticking to the needle.

If perfect removal of burrs is accomplished by this method, the electrolyte-immersed portion of the needle also dissolves while the burrs are being dissolved and removed. The results are that the ground point of the needle loses its sharpness; the piercing effect of the point is lessened; and the toughness of the needle deteriorates with the accompanying hazard of tip bending in use — the same drawbacks recognized with chemical polishing. Further, electrolytic polishing comprises a step of washing with a chemical solution, so the process becomes too complicated for the simple purpose of burr removal. Thus the process is not only inefficient and unsuitable for mass production, but also it has the same drawbacks as chemical polishing, that is, a lack of dimensional accuracy and uniformity of gloss in a large number of products.

A fourth method is the so-called sandblasting method. According to this method, sand with a desired grain size is blasted out of a nozzle, connected to the sand tank by compressed air at 4-6 atm, against the cut or ground portion of the needle, thereby removing the cutting or grinding burrs.

In this method, the blasted portion of the needle acquires a texture of "pear - skin", with the gloss being lost and the color Being changed. At first glance the needle looks as if it were dirty, which may cause a feeling of uncleanliness or apprehension on the part of the user of the injection syringe or the patient receiving the injection. Thus, the use of a blast-polished injection needle is less inviting. Besides, the ground point of the needle after this method of polishing becomes dull with a corresponding reduction in piercing effect.

In view of the productivity of this method, it could be used to process a large number of needles for burr removal at one time. For the purpose of removing the burrs from many needles at the same time with high efficiency, the bevel faces of numerous needle points must be aligned in the same direction. Thus, blasting is done to the needle points under a covering provided over a jig which holds numerous needle tubes taken out of the grinding machine, and accordingly the precision jig is apt to be damaged. Since the jig wears easily, the method is very costly for burr removal. Also, the work site must be changed for each step of washing, drying, checking and so on after burr removal, and during this handling process the needle point may be broken. Hence, this method is also inefficient, unproductive, and complicated.

A fifth method is the so-called liquid honing method. According to this method, a liquid blended with a fine-grain abrasive is sprayed at high speed against the cut or ground portion of the needle tube to remove the cutting or grinding burrs. This method has the same drawbacks as the sand blast method, i.e., blunting of the ground needle point, discoloration of the abrasive-sprayed portion, complexity of the work steps, high cost and lack of mass productivity.

Thus, none of the above-mentioned five conventional methods for burr removal is free from drawbacks such as inferior product quality, excessive time required for the work, lack of mass productivity, and too high cost for the simple work of removing the burrs; and, accordingly, none of them is recommendable.

SUMMARY OF THE INVENTION

The present invention greatly simplifies the method for removing the burrs generated in cutting an injection needle tube to a specified length and in grinding one end of the needle tube thus cut, thereby drastically reducing the time needed for burr removal. According to the invention a high quality injection needle tube with a good piercing effect in the ground state is produced by a burr-removing process which does not deteriorate the toughness and rigidity of the needle tube or the needle point, and does not discolor or dull it. The present invention offers a low-cost, high-productivity method for removing the burrs, which makes it possible to put all the steps from the grinding of the injection needle point, the drying process and on through to the inspection process on a conveyor-line basis, thereby increasing the efficiency of injection needle manufacture and eliminating the possibility of rejects in production.

According to the invention, a number of injection needle tubes cut to a specified length or a number of thus cut injection needle tubes with one end ground are arranged upright, in juxtaposition in a perforated containing means. The container, filled with needle tubes, is carried on a slow-moving conveyor, and from above the container a pressurized water stream is directed toward and sprayed to cover the inner and outer surfaces of all of the needle tubes passing thereunder so that the cutting and grinding burrs generated or adhered in the cutting and grinding of the needles are removed.

BRIEF DESCRIPTION OF THE DRAWINGS

The method of the present invention will become apparent by referring to the detailed description and the accompanying drawings, in which:

FIG. 5 is an oblique view of a partial enlargement of FIG. 4.

DETAILED DESCRIPTION

Figure 1:
FIG. 1 is an elevation view of a cross-section of an injection needle tube made of a fine 18-8 stainless steel tube.
Figure 2:
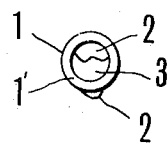
FIG. 2 is an elevation view of a cross-section of an injection needle tube showing the cutting burr sticking to the cut needle portion.
Figure 3A:
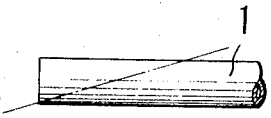
FIG. 3A is an elevation view showing a ground main bevel of an injection needle tube; 3B is a plan view showing the grinding burr sticking to the needle tube after the grinding of the main bevel; 3C is the elevation view corresponding to 3B; 3D is a plan view showing the state of the grinding burr sticking to the needle tube after the grinding of the side bevel; and 3E is the elevation view corresponding to 3D.
Figure 3B:
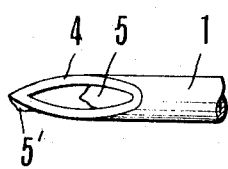
Figure 3C:
Figure 3D:
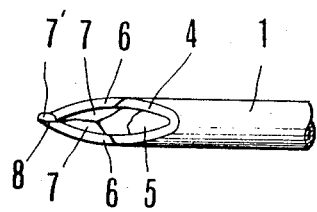
Figure 3E:
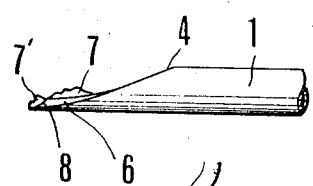

Usually when an injection needle tube (a) made of fine stainless steel tubing is, as indicated in FIG. 1, cut to a specified length to product injection needle 1, a large cutting burr 2 develops and sticks, as shown in FIG. 2, mainly inside of the cut section 1' of injection needle 1, covering the hole 3 of needle 1; and a small cutting burr 2' develops and sticks outside of the cut section 1'.

When one end of needle 1 is ground to form the main bevel 4, as indicated in B, and C of FIG. 3, inside of the main bevel 4 a large grinding burr 5, covering hole 3 of needle 1, develops and sticks, while a small grinding burr 5' develops and sticks outside of the main bevel 4. Further, when side bevels 6 are formed by grinding, as indicated in D, and E of FIG. 3, a large grinding burr 7, covering hole 3 of the needle, develops and sticks inside of side bevels 6, while a small grinding burr 7' develops and sticks to ground point 8, where side bevels 6 join.

It is strickly required that all of these burrs be completely removed from the injection needles in the machining stage of their manufacture, because it is practically impossible to remove them after the products are finished. More importantly, the residual burrs will impede the flow of injected liquid during use of the needle and there is a hazard of the burr being injected into the patient's body together with the injected liquid.

In the conventional practice of removing the burrs from an injection needle, one end of the needle is treated with a stainless steel brush for burr removal or, alternately, any of the above-mentioned five methods for burr removal is used. The other end of the needle, which is ground is also treated for removal of the grinding burrs by any of the five methods.

The main reasons for this practice are as follows: cutting burrs are removed from only one cut end of the needle tube and the grinding burrs and cutting burrs are removed from the ground end after grinding. If both ends are treated for removal of the cutting burrs by any of the five methods, enormous losses in time, labor and materials will be incurred, resulting in an increased cost, an increased inefficiency and an increased deterioration of the products. As explained later, it would be more convenient to remove all the cutting burrs from both cut ends of the needle before grinding the needle point.

The burr-removing method according to the present invention makes it possible to remove all the cutting burrs from both cut ends of the needle tubes and all the grinding burrs can then be removed from the ground end, without deteriorating the needle tube. Some embodiments of the method and apparatus are illustrated as follows:

Removal of Cutting Burrs

A large number of injection needles 1, obtained as the result of cutting the injection needle tubes (a) made of fine 18-8 stainless steel tubes, are arranged upright, close to one another, in heat-resistant synthetic resin basket 10 stretched at the bottom with stainless steel wire net 9 with meshes fine enough to hold injection needles 1, the depth of basket 10 being smaller than the length of injection needle 1.

Meanwhile, an endless wire net belt-conveyor 12, including a drier 11 positioned midway along conveyor 12 and heated by an electric heater or gas, is slowly driven by a motor. Belt-conveyor 12 carrys basket 10 full of injection needles 1.

Above belt-conveyor 12, a pressurized water spray ejecting means, e.g. nozzle 13, connected to a high pressure pump, makes a continuous reciprocating movement in a horizontal direction across the width of conveyor 12 and thereby directs a pressurized water spray against needles 1. The cutting burrs 2 and 2' sticking to one cut end of needles 1 are blown off by the high water pressure.

The continuous reciprocating movement of nozzle 13 in horizontal direction across the width of belt-conveyor 12 permits the pressurized spray of water to cover the whole array of injection needles 1 filling basket 10. Thus, the traveling speed of belt-conveyor 12 and the speed of the reciprocating movement of nozzle 13 must be coordinated so as to assure full coverage of needles 1 in basket 10 by the pressurized water spray.

As for the volume of pressurized water spray directed at the needles, at least 50 kg/cm$^2$ will be sufficient from a standpoint of efficiency, and more than 70 kg/cm$^2$ is desirable. Depending on the hardness of the needle or the quantities of burrs sticking to the needle, the preferred volume will be about 100 kg/cm$^2$ on the average.

After thus removing the cutting burrs 2 and 2' from one cut end of the needles 1, without being passed through the drier 11, all of the needles 1 are shifted to another basket 10 of the same composition, with the ends now freed from the cutting burrs 2 and 2' placed downward. These needles are then submitted to the same treatment as above, for removal of cutting burrs 2 and 2' from the other end thereof.

The hot water used in drier 11 should desirably have a temperature of over 40° C, because the temperature must be high enough to evaporate the water utilized for removal of the cutting burrs. At the time of the second removal of cutting burrs hot water of over 40°C ejected out of spray nozzle 13 will permit drying of needles 1 within the drier 11 faster and more completely.

Needles 1 emerging on belt-conveyor 12 out of the drier 11, after being treated for removal of all of the cutting burrs 2 and 2' from both ends, are subjected to the next step of grinding the needle point.

For the convenience of fitting the needles to the grinder jig without the problem of choosing a particular end, the needles have thus been treated on both ends for removal of all of the cutting burrs 2 and 2'.

This embodiment of the present invention has fully shown that 100 percent removal of cutting burrs can be expected from the use of the method and apparatus of the invention.

Removal of Grinding Burrs

A large number of injection needles 1, which have both ends freed of cutting burrs 2 and 2' as described hereabove and then have one end ground by a known method, are closely arranged with the ground end up in the same basket 10 as described above.

Figure 4:
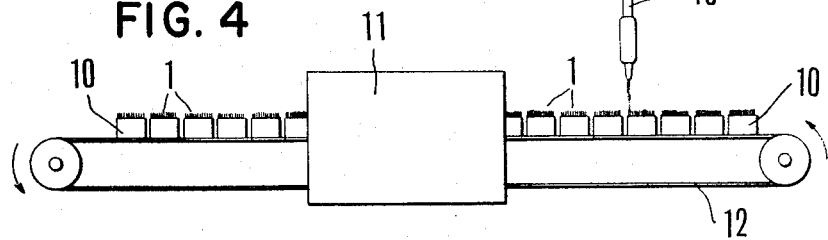
FIG. 4 is an elevation view of the burr-removing apparatus as a whole.

Next, drier 11 is heated up; belt-conveyor 12 is moved; hot water at a temperature over 40°C is ejected at a rate of 100 kg/cm$^2$ from high pressure water spray nozzle 13; baskets 10 are carried in succession, as shown in FIG. 4, on belt-conveyor 12; the pressure of the water spray ejected from said nozzle 13 removes the grinding burrs 5, 7 and 7' from all of the injection needles 1; and after drying in the drier 11, the finished injection needles 1 are obtained.

In the present case, the burr-removing apparatus is constructed and operated in the same way as the one adopted for the removal of the cutting burrs. The results in this instance are equally satisfactory with those described above, with practically 100 percent removal of grinding burrs.

In both cases, the pressurized water spray nozzle 13 is a single nozzle designed to make a continuous reciprocating movement in a horizontal direction across the width of belt-conveyor 12, but it may be designed as a plurality of nozzles rigidly arranged in such a way that the whole width of basket 10 is covered by the spray ejected from the nozzles.

As for the construction of the drier 11, any known drier may be adopted, provided that it can dry all the burr-removed needles 1 filling the basket 10 and so long as it does not impede the travel of belt-conveyor 12.

As described above, the principle in the removal of cutting or grinding burrs from injection needles according to the present invention is the sweeping of the cut or ground portion of the needle with a pressurized water spray. Therefore the removing process is extremely simple, safe, and very fast, the time required being about 1/10 of the time required for the second to fifth methods described above, and also far shorter than the time required for the first mentioned method. Moreover, because no use of chemicals or abrasives and no reduction in wall thickness of the needle tube are involved the method of the invention is never likely to weaken or embrittle the needle tube or the needle point, nor to discolor them, nor to blunt the ground point. Thus the ground product excels in dimensional accuracy and piercing effect. Because of the high gloss both outside and inside of the tube, the product is highly sanitary and safe.

In the burr-removing apparatus according to the invention, a basket full of injection needles is carried on a belt-conveyor; the burrs are removed while the basket is moving; and the needles with the burrs removed are dried. Thus, once the basket is filled with many cut and ground needles, subsequent steps of grinding burr removal, drying and needle point inspection can take place with the needles held in the basket. Accordingly, the process can be put on a conveyor-line mass production basis and this, together with the simplicity of the burr removal step, can dramatically increase the productivity of injection needle manufacture. Moreover, since all the needles are held in the basket throughout the steps of burr removal, drying and needle point inspection and there is no need to transfer the needles to different jigs and vessels for every step, there is no possibility of the needle point being damaged and rejects being productd; thus production costs are lowered.

What is claimed is:

1. A method for removing burrs caused by cutting or grinding from injection needles comprising
   a. placing a plurality of pre-cut injection needle tubes having burrs adhering thereto upright and in juxtaposition in a perforated container capable of retaining said tubes, and
   b. contacting the inner and outer surfaces of said tubes with a water spray under a pressure sufficient to remove the burrs from said tubes.

2. A method according to claim 1 wherein the pre-cut injection needle tubes have been previously ground on one end to form a needle point and have grinding burrs adhering thereto.

3. A method according to claim 1 wherein the volume of water spray directed against the surfaces of said tubes is at least 50 kg/cm$^2$.

* * * * *